Patented Sept. 14, 1948

2,449,141

UNITED STATES PATENT OFFICE 2,449,141

PRODUCTION OF RIBOFLAVIN BY FERMENTATION PROCESSES

Henry L. Pollard, Nelson E. Rodgers, and Reginald E. Meade, Appleton, Wis., assignors to Western Condensing Company, San Francisco, Calif., a corporation of California No Drawing. Application November 11, 1944, Serial No. 563,085

2 Claims. (Cl. 195—42)

This invention relates to processes for the manufacture of biologically active materials such as vitamins by fermentation processes. More particularly, the invention pertains to the synthesis, from lactose-containing products (in particular, lacteal material), of riboflavin and other vitamins by the action of bacteria, and, specifically, by the action of the bacterium Clostridium acetobutylicum.

The present application is a continuation-in-part of the application Serial No. 439,310, filed April 17, 1942, by Henry L. Pollard, Nelson E. Rodgers and Reginald E. Meade, entitled "Process for manufacturing a vitamin concentrate" (now issued as United States Patent No. 2,369,680).

The following paragraphs describe generally a fermentation process to the improvement of which the present invention is particularly directed.

As disclosed in our copending application, we have found that the natural riboflavin content of whey or skim milk may be increased to a considerable extent by subjecting whey or skim milk under controlled conditions to the fermenting action of Clostridium acetobutylicum. Such a fermentation synthesis of riboflavin is accompanied by the formation of neutral solvents such as ethanol, acetone and butanol, and gases such as hydrogen and carbon dioxide, which can be recovered as valuable by-products.

To prepare a lactose-containing lacteal medium such as whey or skim milk for fermentation to increase its riboflavin content, it is sterilized completely or substantially completely, as by heat treatment at about 250° F. for about 10 to 20 minutes. In addition, the acidity of the lacteal medium is neutralized preferably to a pH of 6 to 7 by adding an alkaline reagent such as sodium, potassium or calcium hydroxide. Calcium carbonate may be added to enhance riboflavin production. The iron content of the lacteal medium preferably is adjusted to the range of from 0.5 to less than 4.5 parts per million. In this connection it should be noted that the natural iron content of uncontaminated whey or skim milk will range from 0.10 to 0.21 part per million, while the iron content of whey contaminated, as by corrosive contact with iron containers, may reach a value above 4.5 parts per million. In the case of uncontaminated whey, the iron content may be adjusted upwardly by incorporation of suitable amounts of a soluble ferrous salt such as ferrous sulfate, while whey containing too much iron may be diluted with uncontaminated whey.

The thus prepared material, cooled to a temperature of about 100° F., is placed in a fermenting container and inoculated with Clostridium acetobutylicum (such as described by McCoy, Peterson and Hastings in "Journal of Infectious Diseases," volume 39, page 457) preferably at a temperature about 100° F. under conditions such as will prevent the introduction of iron and contaminating organisms. A suitable inoculum may be prepared from a stock culture by repeated transfers to a nutrient medium such as whey.

In general, fermentation of a batch of whey can continue for from twelve to forty-eight hours, or until there is no noticeable further increase in the riboflavin content.

The gases formed during fermentation can be vented from the fermenting tank as formed. The solvents formed during fermentation can be removed by fractional distillation, and after removing volatile products the fermented material can be concentrated by evaporation to produce a concentrated liquor. If desired, this liquor can be further subjected to drying to produce a powdered product.

If desired, instead of separately fractionating the solvents, they can be condensed from the vapors evolved during concentration of the fermented material by evaporation to form a water-solvent mixture from which the solvents can be removed by fractional distillation.

At some point after fermentation, it is desirable to inhibit further bacterial action, as for example by heat sterilization applied as a separate step or in conjunction with concentration by evaporation.

The product obtained by the above procedure is a concentrate which can be further refined or blended with various food material for human or animal consumption. By use of the process described hereinabove, the riboflavin content of whey has been increased from about 1.4 to from 60 to 70 micrograms per milliliter (before concentration), which corresponds to about 240 to 2800 micrograms per gram on a dried basis.

Some of the lactose is consumed in the fermenting process so that the final product contains a reduced amount of milk sugar, depending upon the extent of fermentation. The solids of the final product are in the remaining solids of the whey or skim milk employed and therefore are available as food ingredients which are used to advantage when the product is blended with other material, such as various milk products, bread and bakery products, poultry and animal feeds, and the like.

The present invention pertains particularly to the addition of soluble magnesium salts to a lactose-containing material to be used in a fermentation process such as that described hereinabove.

More particularly, we have found that increased riboflavin yields can be obtained by incorporating soluble magnesium salts, such as magnesium sulfate or magnesium chloride, with whey being fermented.

It is therefore an important object of the present invention to provide an improved method for synthesizing riboflavin from whey or the like by fermentation with *Clostridium acetobutylicum*.

Another important object of the present invention is to provide a process of the nature indicated including the step of incorporating a soluble salt of magnesium with whey or other lactose-containing medium.

Other and further objects and features of the present invention will become apparent from the following description and appended claims.

In proceeding according to the present invention, the directions given hereinabove as applying to the method of the copending application are followed, except for the variations disclosed hereinbelow.

The effectiveness of the methods of this invention depends largely upon adding the magnesium salt before sterilizing the medium. This point is demonstrated in the following experiment, in which riboflavin synthesis in a whey medium supplemented with magnesium sulfate prior to sterilization has been compared with synthesis in a medium to which the magnesium salt was added after sterilization.

The basal medium used in this experiment was rennet whey supplemented with 4.8 parts per million zinc sulfate heptahydrate, 10 parts per billion para-aminobenzoic acid and 0.2% calcium carbonate. The activity of the magnesium sulfate was tested in the presence of different concentrations of iron, added as ferrous sulfate, as indicated in the accompanying table. At each of the concentrations indicated the magnesium sulfate was sterilized with the medium in one series of cultures and added aseptically as a sterile stock solution to the sterilized medium in another series.

The various media were autoclaved in 100 milliliter volumes, inoculated with 4% of a suitable *Clostridium acetobutylicum* starter and incubated at 100° F. for 38 hours. The riboflavin yields in duplicate cultures are shown in the following table:

siderably in the presence of all concentrations of the magnesium salt added before sterilization. In all cases riboflavin production was improved by autoclaving the medium with magnesium sulfate in the presence of from 0.56 to 1.12 parts per million of added iron.

The effect of a wider range of concentrations of magnesium sulfate sterilized with the medium is indicated in the following table. The general conditions of this experiment were similar to those employed in the foregoing experiment.

| Per Cent Anhydrous MgSO4 | Flavin μg./ml., added Fe in parts per million | | | | | | |
|---|---|---|---|---|---|---|---|
| | 0.56 | 0.84 | 1.12 | 1.40 | 1.68 | 2.24 | 3.36 |
| 0 | 8.0 | 13 | 49 | 41 | 42 | 42 | 13 |
| | 7.7 | 17 | 26 | 38 | 47 | 40 | 15 |
| 0.03 | 29 | 49 | 58 | 49 | 53 | 41 | 13 |
| | 28 | 49 | 46 | 49 | 51 | 40 | 12 |
| 0.06 | 38 | 61 | 55 | 51 | 51 | 39 | 13 |
| | 26 | 55 | 62 | 41 | 50 | 40 | 13 |
| 0.12 | 50 | 64 | 55 | 57 | 50 | 38 | 8.7 |
| | 20 | 61 | 56 | 50 | 50 | 39 | 3.7 |
| 0.30 | 42 | 67 | 52 | 46 | 46 | 32 | 6.1 |
| | 47 | 60 | 61 | 52 | 45 | 33 | 4.8 |
| 0.60 | 40 | 67 | 49 | 48 | 44 | 25 | 3.7 |
| | 41 | 65 | 49 | 44 | 44 | 21 | 10 |

As was observed in the preceding experiment, the response of riboflavin production to magnesium sulfate was dependent on the iron concentration. Although the maximum yields of riboflavin were enhanced materially by concentrations of magnesium sulfate up to 0.6%, the iron concentrations supporting the maximum yields were reduced considerably. In the presence of low concentrations of iron, riboflavin synthesis was improved throughout the entire range of magnesium concentrations tested. In the intermediate range of iron levels (1.12 to 1.68 points per million) magnesium sulfate up to an optimum concentration progressively stimulated synthesis, but above this optimum concentration, stimulation of synthesis was less marked. In the presence of added iron in excess of 1.68 parts per million, synthesis was reduced by magnesium sulfate in concentrations greater than 0.06%.

In general, increased yields of riboflavin are obtained by the addition of from 0.003 to 0.12 or 0.2% or more magnesium in the form of a soluble magnesium salt such as magnesium sulfate or chloride. When the iron concentration exceeds about 2 parts per million, the added magnesium should not exceed 0.012%.

The above examples have been given solely

| Per cent Anhydrous MgSO4 | MgSO4 Addition Before or After Sterilization | Flavin μg./ml., added Fe in parts per million | | | | | | | | |
|---|---|---|---|---|---|---|---|---|---|---|
| | | 0 | 0.28 | 0.56 | 0.84 | 1.21 | 1.40 | 1.68 | 2.24 | 3.36 |
| 0.03 | Before | 4.7 | 4.7 | 7.7 | 23 | 48 | 45 | 42 | 31 | 15.0 |
| | | 4.7 | 4.5 | 8.0 | 22 | 45 | 45 | 41 | 32 | 8.0 |
| | After | 4.1 | 4.3 | 5.7 | 15 | 29 | 45 | 49 | 35 | 18.0 |
| | | 4.0 | 4.0 | 5.5 | 19 | 29 | 45 | 47 | 36 | 17.0 |
| 0.06 | Before | 5.0 | 6.0 | 19.0 | 56 | 51 | 48 | 41 | 31 | 9.3 |
| | | 4.7 | 6.0 | 19.0 | 55 | 51 | 49 | 42 | 32 | 8.3 |
| | After | 4.0 | 4.0 | 6.0 | 16 | 31 | 47 | 47 | 37 | 16.0 |
| | | 4.0 | 4.3 | 6.0 | 17 | 33 | 41 | 47 | 38 | 16.0 |
| 0.12 | Before | 5.0 | 8.0 | 27.0 | 51 | 49 | 47 | 41 | 30 | 6.0 |
| | | 4.7 | 6.6 | 29.0 | 51 | 52 | 47 | 42 | 30 | 6.5 |
| | After | 4.0 | 4.3 | 5.7 | 16 | 30 | 46 | 47 | 38 | 17.0 |
| | | 4.0 | 4.3 | 5.3 | 15 | 38 | 49 | 47 | 38 | 16.0 |

It is evident that supplementing the medium with magnesium sulfate prior to sterilization greatly improved the maximum riboflavin yields over those obtained when adding the supplement after sterilization. Also, it is noteworthy that the optimum iron concentration was reduced conas illustrative of the applications of the methods of this invention to the synthesis of riboflavin from lacteal or other lactose-containing liquids. A number of experiments of this general type form the basis for the claimed methods. Isolated experiments may show minor deviation from the claimed ranges, but in a series of experiments consistently good average yields of riboflavin may be obtained by maintaining the claimed limits.

In the foregoing, particular reference has been made to the synthesis of riboflavin. It is to be understood, however, that other nutritive or vitamin factors or factors of vitamin B complex may be synthesized in addition to riboflavin.

Many details of composition and procedure may be varied within a wide range without departing from the principles of this invention and it is therefore not our purpose to limit the scope of the patent granted on this invention otherwise than necessitated by the scope of the appended claims.

We claim as our invention:

1. In the process for manufacturing a vitamin concentrate including riboflavin by fermenting with *Clostridium acetobutylicum* a material selected from the group consisting of whey and skim milk the improvement comprising incorporating with said material from 0.003 to 0.2% magnesium in the form of a soluble magnesium salt, the iron content of said material in excess of the 0.10 to 0.21 parts per million natural iron content of said material being kept within the range of 0.5 to 4.5 parts per million and not higher than 2 parts per million when at least 0.12% magnesium is added, thereafter sterilizing said material and inoculating said material with a culture of *Clostridium acetobutylicum*.

2. In the process of manufacturing a vitamin concentrate including riboflavin by fermenting whey with *Clostridium acetobutylicum*, the improvement comprising incorporating with said whey from 0.015 to 1% magnesium sulfate, the iron content of said whey in excess of the 0.10 to 0.21 parts per million natural iron content of said whey being kept not lower than 0.5 parts per million and not higher than 2 parts per million, sterilizing said whey and inoculating said whey with a culture of *Clostridium acetobutylicum*.

HENRY L. POLLARD.
NELSON E. RODGERS.
REGINALD E. MEADE.

REFERENCES CITED

The following references are of record in the file of this patent:

UNITED STATES PATENTS

| Number | Name | Date |
|---|---|---|
| 2,089,562 | Legg | Aug. 10, 1937 |
| 2,128,845 | Myers et al. | Aug. 30, 1938 |
| 2,202,161 | Miner | May 28, 1940 |
| 2,297,671 | Yamasaki | Sept. 29, 1942 |
| 2,326,425 | Arzberger | Aug. 10, 1943 |
| 2,369,680 | Meade et al. | Feb. 20, 1945 |

OTHER REFERENCES

Indus. & Eng. Chem., Sept. 1930, page 1011.

Porter, Bacterial Chemistry and Physiology, 1946, Wiley, pp. 629, 674.

Buchanan, Bacteriology, 1938, Macmillan, page 189.

Winton, Structure and Composition of Foods, vol. III, 1937, page 143.